(12) United States Patent
Han et al.

(10) Patent No.: US 12,469,384 B2
(45) Date of Patent: Nov. 11, 2025

(54) METHOD AND DEVICE FOR DETERMINING TRAFFIC STREAM INFORMATION, ELECTRONIC EQUIPMENT AND STORAGE MEDIUM

(71) Applicant: UISEE (SHANGHAI) AUTOMOTIVE TECHNOLOGIES LTD., Shanghai (CN)

(72) Inventors: Zuoyue Han, Shanghai (CN); Zihan Wang, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 302 days.

(21) Appl. No.: 18/035,936

(22) PCT Filed: Nov. 9, 2020

(86) PCT No.: PCT/CN2020/127499
§ 371 (c)(1),
(2) Date: May 9, 2023

(87) PCT Pub. No.: WO2022/095023
PCT Pub. Date: May 12, 2022

(65) Prior Publication Data
US 2023/0419824 A1   Dec. 28, 2023

(51) Int. Cl.
*G08G 1/00* (2006.01)
*B60W 30/12* (2020.01)
(Continued)

(52) U.S. Cl.
CPC ........... *G08G 1/0133* (2013.01); *B60W 30/12* (2013.01); *G08G 1/0129* (2013.01); *G08G 1/056* (2013.01); *G08G 1/065* (2013.01)

(58) Field of Classification Search
CPC .... G08G 1/0133; G08G 1/0129; G08G 1/056; G08G 1/065; G08G 1/167; G08G 1/163;
(Continued)

(56) References Cited

U.S. PATENT DOCUMENTS

2011/0109475 A1* 5/2011 Basnayake ....... G08G 1/096791
340/902
2016/0075280 A1 3/2016 Shin et al.
(Continued)

FOREIGN PATENT DOCUMENTS

CN 103903019 A 7/2014
CN 107402131 A 11/2017
(Continued)

*Primary Examiner* — Shardul D Patel
(74) *Attorney, Agent, or Firm* — Bayramoglu Law Offices LLC

(57) ABSTRACT

A method and a device for determining traffic stream information, electronic equipment and a storage medium are provided. The method includes: grouping each of target vehicles based on motion information of a host vehicle and state information of one or more of the target vehicles to obtain grouping information; determining a fitting weight for each of the target vehicles based on the state information and the grouping information for each of the target vehicles; and generating, by the fitting, one or more pieces of current traffic stream information based on the motion information of the host vehicle, the state information of each of the target vehicles, the fitting weights and the grouping information of each of the target vehicles. The method can generate the current traffic stream information to achieve the sensing of traffic stream.

20 Claims, 3 Drawing Sheets

(51) Int. Cl.
  *G08G 1/01*  (2006.01)
  *G08G 1/056*  (2006.01)
  *G08G 1/065*  (2006.01)

(58) Field of Classification Search
  CPC ............... G08G 1/052; G08G 1/0125; G08G 1/096725; G08G 1/00; B60W 30/12; B60W 2050/0025; B60W 2552/10; B60W 2554/4041; B60W 2554/4042; B60W 2554/4043; B60W 2554/408; B60W 30/10; B60W 2552/53
  USPC .......................................................... 701/118
  See application file for complete search history.

(56) References Cited

U.S. PATENT DOCUMENTS

| | | | |
|---|---|---|---|
| 2018/0247537 A1 | 8/2018 | Oh et al. | |
| 2019/0355258 A1* | 11/2019 | Kimura | G08G 1/096733 |
| 2020/0064846 A1 | 2/2020 | Chen et al. | |

FOREIGN PATENT DOCUMENTS

| | | | |
|---|---|---|---|
| CN | 108171967 | A | 6/2018 |
| CN | 109242912 | A | 1/2019 |
| CN | 109683617 | A | 4/2019 |
| CN | 110703754 | A | 1/2020 |
| CN | 110782667 | A | 2/2020 |
| CN | 111176269 | A | 5/2020 |
| CN | 111241224 | A | 6/2020 |
| CN | 111325187 | A | 6/2020 |
| CN | 111738207 | A | 10/2020 |
| JP | 2000132783 | A | 5/2000 |
| JP | 2003156413 | A | 5/2003 |
| JP | 2009214838 | A | 9/2009 |
| JP | 2011118889 | A | 6/2011 |
| JP | 2016071383 | A | 5/2016 |
| WO | 2020098297 | A1 | 5/2020 |

* cited by examiner

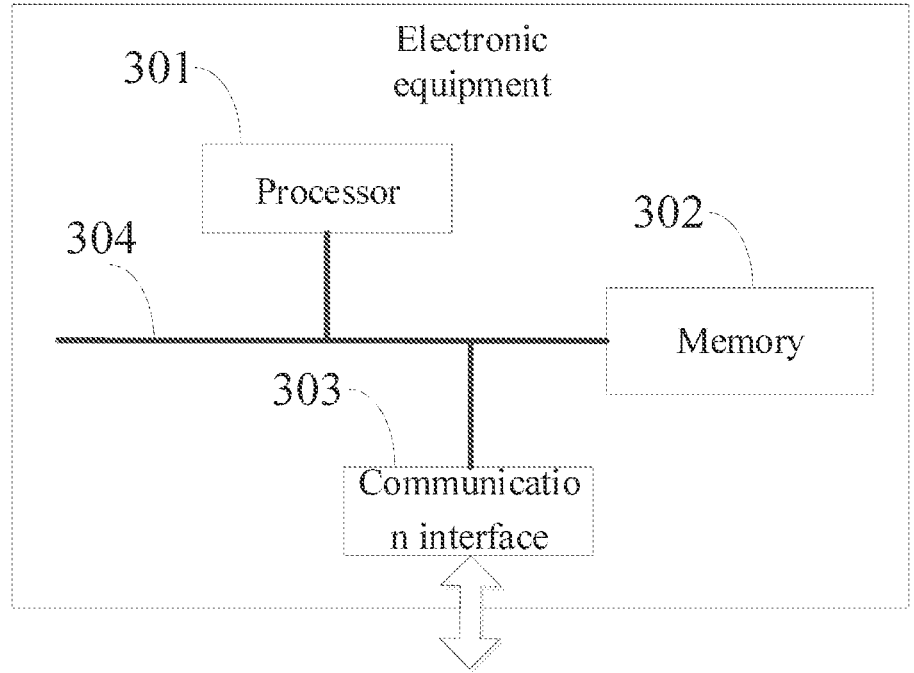

FIG. 3

Grouping each of target vehicles based on motion information of a host vehicle and state information of one or more of the target vehicles to obtain grouping information — 401

Determining a fitting weight for each of the target vehicles based on the state information and the grouping information for each of the target vehicles — 402

Generating, by the fitting, one or more pieces of current traffic stream information based on the motion information of the host vehicle, the state information of each of the target vehicles, the fitting weights and the grouping information of each of the target vehicles — 403

FIG. 4

METHOD AND DEVICE FOR DETERMINING TRAFFIC STREAM INFORMATION, ELECTRONIC EQUIPMENT AND STORAGE MEDIUM

CROSS REFERENCE TO THE RELATED APPLICATIONS

This application is the national phase entry of International Application No. PCT/CN2020/127499, filed on Nov. 9, 2020, the entire contents of which are incorporated herein by reference.

TECHNICAL FIELD

Embodiments of the present disclosure relate to the technical field of intelligent driving, and more particularly, to a method and a device for determining traffic stream information, electronic equipment and a storage medium.

BACKGROUND

In the current intelligent driving system for structured roads, in the process of driving environment sensing, the positioning of vehicle lateral position and the generation of target travel path are usually based on the lane line information collected by the forward camera of the vehicle. It can be seen that the accuracy of vehicle lateral positioning (namely, positioning of a lane where a vehicle is located), vehicle lateral control and target travel path generation depends on the recognition accuracy of a lane line by an intelligent driving system or a camera.

However, there are a number of factors that currently cause lane lines to not be accurately identified. For example, when the road traffic is relatively congested, the speed of the host vehicle and the preceding vehicle is relatively low, the vehicle distance is relatively close, and the traffic stream in both lanes is relatively dense, the sensing distance and the field of view of the forward camera of the vehicle will be limited. Under this condition, it will be very difficult to identify the lane line according to the image data collected by the camera. In addition, due to various reasons such as road construction, lane change, excessive traffic stream, etc., it occurs that the lane lines are unclear, and old lane lines are insufficiently cleaned, which interferes with accurate lane line recognition.

It can be seen that there is a need for other sensing means to reduce the impact of lane line non-recognition or low recognition accuracy on the vehicle lateral positioning, vehicle lateral control and target travel path generation. Therefore, there is an urgent need to provide a new sensing means capable of sensing traffic stream information. The traffic stream can be understood as a traffic stream formed by multiple vehicles moving in the same direction on the same lane. The traffic stream information can be understood as information about the trajectory of traffic stream.

SUMMARY

The present disclosure provides a new means of sensing traffic stream information. At least one embodiment of the present disclosure provides a method and a device for determining traffic stream information, electronic equipment and a storage medium.

In a first aspect, a method for determining traffic stream information provided by an embodiment of the present disclosure comprises:

grouping each of target vehicles based on motion information of a host vehicle and state information of one or more of the target vehicles to obtain grouping information;

determining a fitting weight for each of the target vehicles based on the state information and the grouping information for each of the target vehicles; and generating, by the fitting, one or more pieces of current traffic stream information based on the motion information of the host vehicle, the state information of each of the target vehicles, the fitting weights and the grouping information of each of the target vehicles.

In some embodiments, the grouping each of target vehicles based on motion information of a host vehicle and state information of one or more of the target vehicles to obtain grouping information comprises:

determining a travel trajectory of the host vehicle based on the motion information of the host vehicle;

filtering one or more effective target vehicles based on the motion information of the host vehicle and the state information of each of the target vehicles; and grouping each of the effective target vehicles based on the travel trajectory of the host vehicle and the state information of each of the effective target vehicles to obtain grouping information.

In some embodiments, after obtaining the grouping information, the method further comprises:

modifying the grouping information based on historical traffic stream information; and accordingly, determining the fitting weight for each of the effective target vehicles based on the historical traffic stream information, the state information of each of the effective target vehicles, and the modified grouping information.

In some embodiments, the grouping each of the effective target vehicles based on the travel trajectory of the host vehicle and the state information of each of the effective target vehicles to obtain grouping information comprises:

for each of the effective target vehicle, determining a relative lane on which the effective target vehicle is located based on the state information of the effective target vehicle and the travel trajectory of the host vehicle; and determining the grouping information for the effective target vehicle based on the relative lane.

In some embodiments, the grouping information comprises the following five groups: a first lane group on a left side of the lane on which the host vehicle is located, a second lane group on a left side of the lane on which the host vehicle is located, a first lane group on a right side of the lane on which the host vehicle is located, a second lane group on a right side of the lane on which the host vehicle is located, and other groups.

In some embodiments, before the generating, by the fitting, one or more pieces of current traffic stream information, the method further comprises:

judging whether the number of target vehicles satisfies a preset fitting quantity; if so, judging whether the travel state of the host vehicle is straight;

acquiring cached historical vehicles if the travel state of the host vehicle is straight;

updating coordinates of each of the historical vehicles to obtain virtual vehicles corresponding to each of the historical vehicles and state information of each of the virtual vehicles;

determining a fitting weight for each of the virtual vehicles based on the historical traffic stream information, the motion information of the host vehicle, the state information of each of the virtual vehicles, and grouping information of each of the virtual vehicles; and accordingly, the generating, by the fitting, one or more pieces of current traffic stream information comprises generating, by the fitting, one or more pieces of current traffic stream information based on the state information of each of the target vehicles, the fitting weight of each of the target vehicles, the state information of each of the virtual vehicles, and the fitting weight of each of the virtual vehicles.

In some embodiments, the historical vehicle satisfies a cache condition, wherein the cache condition is used for screening vehicles which travel in the same direction as the host vehicle and do not belong to other groups.

In some embodiments, the cache condition comprises the followings:

the vehicle is located in front of the host vehicle and the relative distance to the host vehicle is greater than a preset relative distance threshold;

the angle between the direction of the speed of the vehicle relative to the host vehicle and the direction of travel of the host vehicle is less than a preset angle threshold; and the lateral distance of the vehicle relative to the host vehicle is within a preset lateral distance range.

In some embodiments, the cache condition further comprises that the life cycle of the vehicle is greater than a preset life cycle threshold.

In some embodiments, the determining a fitting weight for each of the target vehicles comprises:

for each of the target vehicles, determining a lateral speed deviation weight of the target vehicle, a lateral displacement deviation weight of the target vehicle, a life cycle weight of the target vehicle, and a speed weight of the target vehicle based on the state information of the target vehicle and the grouping information of the target vehicle; and multiplying the lateral speed deviation weight of the target vehicle, the lateral displacement deviation weight of the target vehicle, the life cycle weight of the target vehicle, and the speed weight of the target vehicle to obtain the fitting weight of the target vehicle.

In some embodiments, the determining a fitting weight for each of the virtual vehicles comprises:

for each of the virtual vehicles, determining a lateral speed deviation weight of the virtual vehicle, a lateral displacement deviation weight of the virtual vehicle, a life cycle weight of the virtual vehicle, a speed weight of the virtual vehicle, and a weight of the virtual vehicle based on the state information of the virtual vehicle and the grouping information of the virtual vehicle; and multiplying the lateral speed deviation weight of the virtual vehicle, the lateral displacement deviation weight of the virtual vehicle, the life cycle weight of the virtual vehicle, the speed weight of the virtual vehicle, and the weight of the virtual vehicle to obtain the fitting weight of the virtual vehicle.

In some embodiments, each group corresponds to a traffic stream; the generating, by the fitting, one or more pieces of current traffic stream information comprises:

for one of the groups:

selecting a fit method based on the number of target vehicles in the group and the longitudinal distribution distance of all target vehicles in the group; and generating, by fitting, current traffic stream information corresponding to the group based on the selected fit method and by using the motion information of the host vehicle, the state information of each of the target vehicles in the group and the fitting weight of each of the target vehicles in the group.

In some embodiments, the selecting a fit method based on the number of target vehicles in the group and the longitudinal distribution distance of all target vehicles in the group comprises:

judging whether the number of target vehicles in the group satisfies a first number condition and whether the longitudinal distribution distance is greater than a preset first distance threshold;

if the first number condition is satisfied and the longitudinal distribution distance is greater than the preset first distance threshold, selecting a first-order fitting and a second-order fitting; otherwise, judging whether the number of target vehicles in the group satisfies a second number condition and whether the longitudinal distribution distance is greater than a preset second distance threshold; and if the second number condition is satisfied and the longitudinal distribution distance is greater than a preset second distance threshold, selecting a first-order fitting; otherwise, making no fitting.

In some embodiments, if the first-order fitting and the second-order fitting are selected, the generating, by fitting, current traffic stream information corresponding to the group comprises:

generating, by fitting, a first-order fitting result corresponding to the group, and determining a first mean square error of the first-order fitting result;

generating, by fitting, a second-order fitting result corresponding to the group, and determining a second mean square error of the second-order fitting result; and comparing the first mean square error and the second mean square error, and if the first mean square error is greater than a preset multiple of the second mean square error, selecting the second-order fitting result as the current traffic stream information corresponding to the group; otherwise, selecting the first-order fitting result as the current traffic stream information corresponding to the group.

In some embodiments, the generating, by fitting, current traffic stream information corresponding to the group based on the selected fit method and by using the motion information of the host vehicle, the state information of each of the target vehicles in the group and the fitting weight of each of the target vehicles in the group comprises:

generating, by the fitting, initial traffic stream information corresponding to the group based on the state information of each of the target vehicles in the group and the fitting weight of each of the target vehicles in the group; and constraining the initial traffic stream information based on the historical traffic stream information and the motion information of the host vehicle to obtain current traffic stream information corresponding to the group.

In some embodiments, the constraint comprises at least one of a position constraint, a heading constraint and a curvature constraint.

In some embodiments, the position constraint comprises constraining a variable quantity of a constant term in a fitting parameter corresponding to the initial traffic stream information based on a confidence level corresponding to the historical traffic stream information;

wherein the relationship between the variable quantity of the constant item and the confidence level corresponding to the historical traffic stream information is an inverse correlation; and the relationship between the variable quantity of the constant term and the fitting quantity corresponding to the initial traffic stream information is a positive correlation.

In some embodiments, the heading constraint comprises constraining a variable quantity of a monomial term in the fitting parameter corresponding to the initial traffic stream information based on the confidence level corresponding to the historical traffic stream information and/or the motion information of the host vehicle;
wherein the relationship between the variable quantity of the monomial term and the confidence level corresponding to the historical traffic stream information is an inverse correlation, the relationship between the variable quantity of the monomial term and a steering range of the host vehicle is a positive correlation, and/or the relationship between the variable quantity of the monomial term and the fitting quantity corresponding to the initial traffic stream information is a positive correlation.

In some embodiments, the curvature constraint comprises constraining a variable quantity of a quadratic term in the fitting parameter corresponding to the initial traffic stream information based on the confidence level corresponding to the historical traffic stream information and/or the motion information of the host vehicle;
wherein the relationship between the variable quantity of the quadratic term and the confidence level corresponding to the historical traffic stream information is an inverse correlation, the relationship between the variable quantity of the quadratic term and the speed of the host vehicle is an inverse correlation, and/or the relationship between the variable quantity of the quadratic term and a speed of a steering wheel of the host vehicle is a positive correlation.

In some embodiments, the method further comprises:
determining a confidence level increment based on the current traffic stream information;
determining a confidence level corresponding to the current traffic stream information based on the confidence level of the historical traffic stream information and the confidence level increment;
wherein the relationship between the confidence level increment and the mean square error of the fitting result corresponding to the current traffic stream information is an inverse correlation, the relationship between the confidence level increment and the fitting quantity corresponding to the current traffic stream information is a positive correlation, and/or the relationship between the confidence level increment and the longitudinal distribution distance of the target vehicle corresponding to the current traffic stream information is a positive correlation.

In some embodiments, the determining a confidence level increment based on the current traffic stream information comprises:
if two pieces of current traffic stream information intersects, then comparing the fitting quantity and the longitudinal distribution distance corresponding to the two pieces of traffic stream; and determining the confidence level increment corresponding to the current traffic stream information with a less fitting quantity or a shorter longitudinal distribution distance to be negative.

In some embodiments, the method further comprises determining a travel reference path of the host vehicle based on the current traffic stream information and the confidence level corresponding to the current traffic stream information;
the determining the travel reference path of the host vehicle comprises:
if the confidence levels corresponding to the current traffic stream information on both sides of the host vehicle are both higher than a preset confidence level threshold, determining that the parameter of the travel reference path of the host vehicle is a weighted average value of the fitting parameter corresponding to the current traffic stream information on both sides of the host vehicle;
wherein the relationship between the weight of the fitting parameter corresponding to the current traffic stream information on both sides of the host vehicle and the change rate of the fitting parameter is an inverse correlation;
if the confidence level corresponding to the current traffic stream information on only one side of the host vehicle is higher than a preset confidence level threshold, determining that the monomial term and the quadratic term in the parameter of the travel reference path of the host vehicle are the same as the monomial term and the quadratic term in the fitting parameter corresponding to the current traffic stream information on the side, wherein the constant term in the parameter of the travel reference path of the host vehicle is zero;
if the confidence levels corresponding to the current traffic stream information on both sides of the host vehicle are both lower than the preset confidence level threshold, determining that the parameters of the travel reference path of the host vehicle are all zero.

In some embodiments, the method further comprises determining an auxiliary location marker based on the current traffic stream information and the confidence level corresponding to the current traffic stream information;
the determining an auxiliary location marker comprises:
if the confidence levels corresponding to the current traffic stream information on both sides of the host vehicle are both higher than the preset confidence level threshold, determining the auxiliary location marker as a first marker;
if the confidence level corresponding to the current traffic stream information on the left side of the host vehicle is higher than the preset confidence level threshold, determining the auxiliary location marker as a second marker; and
if the confidence level corresponding to the current traffic stream information on the right side of the host vehicle is higher than the preset confidence level threshold, determining the auxiliary location marker as a third marker.

In a second aspect, a device for determining traffic stream information provided by an embodiment of the present disclosure comprises:
a grouping module configured for grouping each of target vehicles based on motion information of a host vehicle and state information of one or more of the target vehicles to obtain grouping information;
a determination module configured for determining a fitting weight for each of the target vehicles based on the state information and the grouping information for each of the target vehicles; and
a fitting module configured for generating, by the fitting, one or more pieces of current traffic stream information based on the motion information of the host vehicle, the state information of each of the target vehicles, the fitting weights and the grouping information of each of the target vehicles.

In a third aspect, embodiments of the present disclosure provide an electronic equipment comprising a processor and a memory, wherein the processor is operable to perform the steps of the method for determining traffic stream information according to any of the embodiments of the first aspect by invoking programs or instructions stored in the memory.

In a fourth aspect, embodiments of the present disclosure provide a non-transitory computer-readable storage medium for storing programs or instructions for causing a computer to perform the steps of the method for determining traffic stream information as described in any of the embodiments of the first aspect.

It can be seen that, in at least one embodiment of the present disclosure, by grouping a plurality of target vehicles and determining the fitting weight of each of the target vehicles, the method can generate the current traffic stream information by fitting based on the grouping information, the fitting weight, the motion information of the host vehicle and the state information of the target vehicle, so as to achieve the sensing of traffic stream.

BRIEF DESCRIPTION OF THE DRAWINGS

In order to more clearly describe the technical solutions in the embodiments of the embodiments of the present disclosure, the drawings to be used in the description of the embodiments or the prior art will be briefly introduced below. It will be apparent to those skilled in the art that the drawings in the following description are only some embodiments of the present disclosure, and that other drawings may be obtained from from these drawings.

FIG. 3 is an exemplary block diagram of an electronic equipment provided by an embodiment of the present disclosure;

FIG. 4 is an exemplary flowchart of a method for determining traffic stream information provided by an embodiment of the present disclosure;

DETAILED DESCRIPTION OF THE EMBODIMENTS

Figure 1:
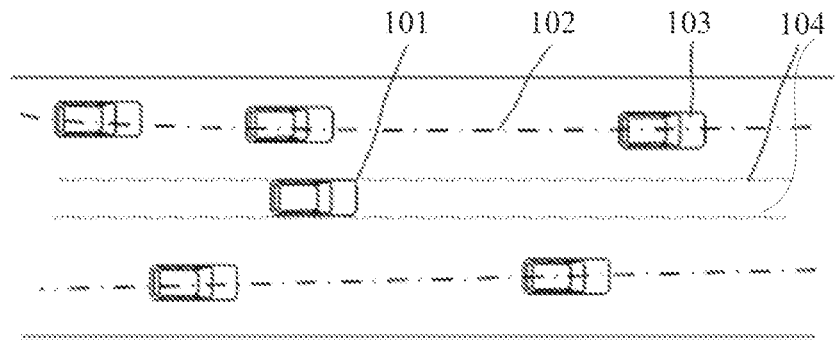
FIG. 1 is an exemplary scenario diagram for determining traffic stream information provided by an embodiment of the present disclosure.

In order that the above-recited objects, features and advantages of the present disclosure may be more clearly understood, a more particular description of the disclosure will be rendered by reference to the appended drawings and embodiments. It should be understood that the described embodiments are part of, but not all of the embodiments of the disclosure. The particular embodiments described herein are illustrative only and are not limiting of the disclosure. Based on the described embodiments of the present disclosure, all other embodiments available to one of ordinary skill in the art are within the scope of the present disclosure.

It should be noted that relational terms such as first and second, and the like, may be used herein to distinguish one entity or action from another entity or action without necessarily requiring or implying any such actual relationship or order between such entities or actions.

With the development of intelligent driving technology, long-distance path planning will become a necessary capability of higher-level automatic driving systems such as L3, and this planning capability needs to accurately locate a lane where a host vehicle is located. With the current low-cost satellite positioning system, the lane where the host vehicle is located cannot be accurately located, and the recognition of the lane line type by the intelligent driving system or the camera cannot guarantee the accurate judgment of the current lane. In addition, there are various factors that cause the lane line to be inaccurate to be identified, for example, the factors mentioned in the background art, which will not be described in detail herein.

Therefore, the embodiments of the present disclosure provide a new sensing means capable of sensing traffic stream information. The traffic stream can be understood as a traffic stream formed by multiple vehicles moving in the same direction on the same lane. The traffic stream information can be understood as information about the trajectory of traffic stream. Since a lane line can be regarded as a line and a trajectory can also be regarded as a line, the traffic stream information can replace the lane line for vehicle lateral positioning (i.e., positioning of a lane on which a vehicle is located), vehicle lateral control, and target travel path generation.

Embodiments of the present disclosure provide a method and a device for determining traffic stream information, electronic equipment and a storage medium. By grouping a plurality of target vehicles and determining the fitting weight of each of the target vehicles, the method can generate the current traffic stream information by fitting based on the grouping information, the fitting weight, the motion information of the host vehicle and the state information of the target vehicle, so as to achieve the sensing of traffic stream. Embodiments of the present disclosure may be applied to an intelligent driving vehicle, and may also be applied to electronic equipment. The intelligent driving vehicle is a vehicle equipped with different levels of intelligent driving systems including, for example, an unmanned driving system, an assisted driving system, a driving assistance system, a highly automatic driving system, a fully automatic driving vehicle, etc. The electronic equipment is equipped with an intelligent driving system. For example, the electronic equipment may be used to test an intelligent driving algorithm. For example, the electronic equipment may be an on-board device. In some embodiments, the electronic equipment may also be applied to other fields. In order to make the description more clear, the embodiments of the present disclosure describe the method and device for determining traffic stream information, electronic equipment or a storage medium by taking an intelligent driving vehicle as an example.

FIG. 1 is an exemplary scenario diagram for determining traffic stream information provided by an embodiment of the present disclosure. In FIG. 1, a host vehicle 101 is traveling straight. A left-right boundary of a trajectory of the host vehicle is 104. Three vehicles are on the left side of the host vehicle, such as 103 in FIG. 1, and two vehicles are on the right side. It is desirable to determine left-side traffic stream information of the host vehicle, such as a trajectory 102 corresponding to the left-side traffic stream in FIG. 1, and determine right-side traffic stream information of the host vehicle by a method for determining traffic stream information provided by an embodiment of the present disclosure.

Figure 2:
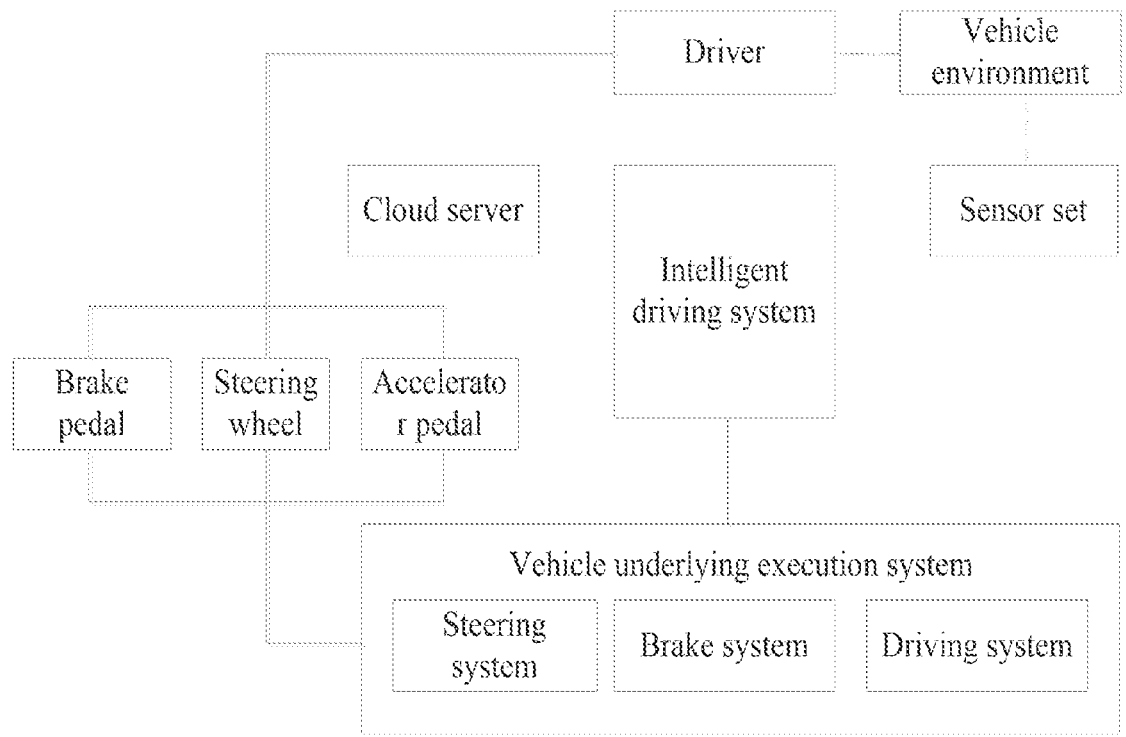
FIG. 2 is an exemplary architectural diagram of an intelligent driving vehicle provided by an embodiment of the present disclosure.

FIG. 2 is an exemplary overall architecture diagram of an intelligent driving vehicle provided by an embodiment of the present disclosure. The intelligent driving vehicle shown in FIG. 2 may be implemented as the vehicle 101 in FIG. 1. As shown in FIG. 2, the intelligent driving vehicle includes a sensor set, a smart driving system, a vehicle underlying execution system, and other components that may be used to drive and control operation of the vehicle, such as a brake pedal, a steering wheel, and an accelerator pedal.

The sensor set is used for collecting data of the vehicle environment and detecting position data of the vehicle. The sensor set includes, for example, but is not limited to, at least one of a camera, a lidar, a millimeter-wave radar, an ultrasonic radar, a GPS (Global Positioning System), and a IMU (Inertial Measurement Unit).

In some embodiments, the sensor set is also used to collect dynamic data of the vehicle. For example, the sensor set also includes, but is not limited to, at least one of a wheel speed sensor, a speed sensor, an acceleration sensor, a steering wheel angle sensor, and a front wheel angle sensor.

The intelligent driving system is used for acquiring sensing data of the sensor set. The sensing data includes, but is not limited to, an image, a video, a laser point cloud, millimeter waves, GPS information, a vehicle state, etc. In some embodiments, the intelligent driving system performs environmental sensing and vehicle location based on the sensed data to generate sensed information and vehicle position and attitude; performing planning and decision-making based on the sensed information and the vehicle position and attitude, and generating planning and decision-making information; generating vehicle control commands based on the planning and decision information and issuing the same to the vehicle underlying execution system. The control instructions may include, but are not limited to, steering wheel steering, lateral control commands, longitudinal control commands, etc.

In some embodiments, the intelligent driving system acquires sensor data, V2X (Vehicle to X, wireless communication for vehicles) data, high-precision map data, etc. performs environment sensing and positioning based on at least one of the above data, and generates sensing information and positioning information. The sensing information may include, but is not limited to, at least one of obstacle information, road signs/marks, pedestrian/vehicle information, and travelable area. The positioning information includes a vehicle position and attitude.

In some embodiments, the intelligent driving system generates planning and decision information based on the sensed information and the vehicle position and attitude, and at least one of V2X data, high precision maps, and the like. Herein, the planning information may include, but is not limited to, planning paths, etc. The decision information may include, but is not limited to, at least one of behaviors (e.g. including but not limited to following, passing, parking, bypassing, etc.), vehicle heading, a vehicle speed, a desired acceleration of the vehicle, a desired steering wheel angle, etc.

In some embodiments, the method for determining traffic stream information provided by embodiments of the present disclosure may be applied in the intelligent driving system.

In some embodiments, the intelligent driving system may be a software system, a hardware system, or a combination of hardware and software system. For example, the intelligent driving system is a software system running on an operating system, and the in-vehicle hardware system is a hardware system supporting the operation of the operating system.

In some embodiments, the intelligent driving system may interact with a cloud server. In some embodiments, the intelligent driving system interacts with the cloud server via a wireless communication network (e.g., a wireless communication network including, but not limited to, a GPRS network, a Zigbee network, a Wifi network, a 3G network, a 4G network, a 5G network, etc.).

In some embodiments, the cloud server is configured to interact with the vehicle. Herein, the cloud server can send environment information, positioning information, control information, and other information required during the intelligent driving of the vehicle to the vehicle. In some embodiments, the cloud server may receive sensed data from the vehicle, vehicle state information, vehicle travel information, and related information requested by the vehicle. In some embodiments, the cloud server may remotely control the vehicle based on user settings or vehicle requests. In some embodiments, the cloud server may be a server or a group of servers. The server group may be centralized or distributed. In some embodiments, the cloud server may be local or remote.

The vehicle underlying execution system receives vehicle control commands and controls vehicle travel based on the vehicle control commands. In some embodiments, the vehicle underlying execution system includes, but is not limited to, a steering system, a brake system and a driving system. In some embodiments, the vehicle underlying execution system may also include an underlying controller that may interpret vehicle control commands and issue them to corresponding systems such as a steering system, a brake system, and a driving system, respectively.

In some embodiments, the intelligent driving vehicle may also include a vehicle CAN bus, not shown in FIG. 2, that interfaces with the vehicle underlying execution system. The information interaction between the intelligent driving system and the vehicle underlying execution system is communicated via the vehicle CAN bus.

FIG. 3 is a schematic structural diagram of an electronic equipment provided by an embodiment of the present disclosure. In some embodiments, the electronic equipment may be vehicle-mounted equipment. In some embodiments, the electronic equipment may support operation of the intelligent driving system.

As shown in FIG. 3, the electronic equipment includes at least one processor 301, at least one memory 302, and at least one communication interface 303. The various components in the in-vehicle equipment are coupled together by a bus system 304. The communication interface 303 is used for information transmission with external equipment. Understandably, the bus system 304 is used to enable connection communication between these components. The bus system 304 includes a power bus, a control bus, and a state signal bus in addition to a data bus. For clarity of illustration, however, the various buses are labeled in FIG. 3 as the bus system 304.

It will be appreciated that the memory 302 in this embodiment may be either a volatile memory or a nonvolatile memory, or may include both the volatile and nonvolatile memory.

In some embodiments, the memory 302 stores the following elements, executable units, or data structures, or a subset thereof, or an extended set thereof: operating systems and applications.

The operating system, among other things, contains various system programs, such as framework layers, core library layers, driver layers, etc. for implementing various basic tasks and handling hardware-based tasks. The applications, including various applications such as Media Player, Browser, etc. are used to implement various application tasks. The program implementing the method for determining traffic stream information provided by embodiments of the present disclosure may be included in an application program.

In embodiments of the present disclosure, the processor 301 is used for performing the steps of embodiments of the method for determining traffic stream information provided by embodiments of the present disclosure by invoking programs or instructions stored in the memory 302, and in particular, programs or instructions stored in an application.

The method for determining traffic stream information provided by embodiments of the present disclosure may be applied to or implemented by the processor 301. The processor 301 may be an integrated circuit chip having signal processing capabilities. In implementation, the steps of the method described above may be performed by integrated logic circuit in the hardware or instructions in the software in the processor 301. The processor 301 may be a general purpose processor, a digital signal processor (DSP), an application specific integrated circuit (ASIC), a field programmable gate array (FPGA) or other programmable logic device, a discrete gate or transistor logic device, a discrete hardware component. The general purpose processor may be a microprocessor or the processor may be any conventional processor or the like.

The steps of the method for determining traffic stream information provided by the embodiments of the present disclosure may be directly embodied as being performed by a hardware decoding processor, or performed by a combination of hardware and software units in a decoding processor. The software unit may be located in a mature storage medium in the art such as a random access memory, a flash memory, a read-only memory, a programmable read-only memory or an electrically erasable programmable memory, a register, etc. The storage medium is located in a memory 302, and the processor 301 reads the information in the memory 302 and completes the steps of the method in combination with its hardware.

FIG. 4 is an exemplary flowchart of a method for determining traffic stream information provided by an embodiment of the present disclosure. The execution subject of the method is electronic equipment, and in some embodiments may also be an intelligent driving system supported by the electronic equipment. For convenience of description, in the following embodiments, the flow of the method for determining traffic stream information will be with the intelligent driving system as the execution subject.

As shown in FIG. 4, in step 401, the intelligent driving system groups each of the target vehicles based on the motion information of the host vehicle and the state information of one or more target vehicles to obtain grouping information.

In some embodiments, the motion information of the host vehicle is driving-related dynamics information of the host vehicle during driving. For example, the motion information of the host vehicle may include, but is not limited to, a wheel speed, a vehicle speed, an acceleration, a steering wheel angle, a front wheel angle, and a yaw velocity. In some embodiments, the motion information of the host vehicle may be collected by the sensor set shown in FIG. 1. The intelligent driving system may acquire the motion information of the host vehicle from the sensor set.

In some embodiments, the intelligent driving system acquires sensor data, V2X data, high-precision map data, and the like, and senses the environment based on at least one of the above data to obtain state information of one or more target vehicles.

In some embodiments, the state information of the target vehicle is a generic term for information such as relative position and relative motion between the target vehicle and the host vehicle. For example, the state information of the target vehicle may include, but is not limited to, at least one of a lateral displacement, a longitudinal displacement, a lateral speed, and a longitudinal speed of the target vehicle with respect to the host vehicle. The lateral direction may be understood as a landscape orientation, i.e., perpendicular to the lane line direction. In some embodiments, the state information of the target vehicle may also include, but is not limited to, one or more of identification (ID), a sensing type, a life cycle, and target confidence level, etc. Here, the life cycle can be understood as a time period from the time when the target vehicle is first sensed to the current time, that is, a time period during which the target vehicle appears in the "view" of the host vehicle. The target confidence level is used to represent the credibility of the target vehicle, and is automatically generated by the sensing algorithm of the intelligent driving system.

In some embodiments, when grouping each of the target vehicles, the grouping rule adopted by the intelligent driving system divides the groups of the target vehicles into five groups according to the lane on which they are located: a first lane group on a left side of the lane on which the host vehicle is located, a second lane group on a left side of the lane on which the host vehicle is located, a first lane group on a right side of the lane on which the host vehicle is located, a second lane group on a right side of the lane on which the host vehicle is located, and other groups. The other groups are any cases other than the aforementioned four groups. For example, the other groupings may be one or more of a lane on which the host vehicle is located, a third lane to the left of the lane on which the host vehicle is located, and a third lane to the right of the lane on which the host vehicle is located.

In some embodiments, after grouping each of the target vehicles, the intelligent driving system may group and mark each of the target vehicles for characterizing the group to which the target vehicle belongs. For example, the grouping mark may be a grouping flag bit of which different values represent different groups. In this embodiment, the grouping information includes at least a group mark. In some embodiments, the grouping information may also include, but is not limited to, one or more of an ID of the target vehicle, a sensing type, a life cycle, and a target confidence level, etc.

In some embodiments, the intelligent driving system determines a travel trajectory of the host vehicle based on motion information of the host vehicle when grouping each of the target vehicles. Furthermore, based on the travel trajectory of the host vehicle and the state information of each of the target vehicles, a relative lane on which each of the target vehicles is located (the relative lane being relative to a lane on which the host vehicle is located) can be determined. Thus, the grouping information can be obtained by grouping each of the target vehicles according to the aforementioned grouping rule based on the relative lane on which each of the target vehicles is located.

In some embodiments, when determining the travel trajectory of the host vehicle, the intelligent driving system calculates a turning radius of the host vehicle after filtering based on the signals of the vehicle speed, the steering wheel angle and the yaw velocity of the host vehicle, and then determines the current travel trajectory of the host vehicle based on the turning radius. It should be noted that determining the travel trajectory from the turning radius is a mature technology in the field of intelligent driving, and a detailed determination process will not be described here.

In some embodiments, considering that the target vehicle may be an ineffective vehicle. For example, the target vehicle runs in an opposite direction with that of the host vehicle, and should not participate in the subsequent fitting traffic stream information. Therefore, in order to avoid the ineffective vehicle participating in the subsequent fitting traffic stream information, resulting in a decrease in fitting accuracy, in the present embodiment, the intelligent driving system first screens the effective target vehicles and filters the ineffective target vehicles before grouping. Then, based on the travel trajectory of the host vehicle and the state information of each effective target vehicle, each effective target vehicle is grouped to obtain grouping information.

In some embodiments, during the screening the effective target vehicles, the intelligent driving system screens one or more effective target vehicles based on the motion information of the host vehicle and the state information of each of the target vehicles. For example, the intelligent driving system performs screening by removing ineffective target vehicles including: a target vehicle of which the longitudinal speed is negative (the speed of the host vehicle is positive) or a target vehicle of which the longitudinal distance is greater than a preset longitudinal distance threshold. That is, the longitudinal speed of the effective target vehicle is positive (or zero) and the longitudinal distance thereof is less than or equal to the preset longitudinal distance threshold.

In some embodiments, considering that when grouping the target vehicles, the host vehicle may be moving non-directly, such as lane changing, steering, etc. which may cause grouping errors. For example, the target vehicle should be divided into a first lane group on a left side of the lane on which the host vehicle is located while keeping the first lane on the left side of the host vehicle straight. However, when the host vehicle rapidly turns to the right, the target vehicle may be divided into a second lane group on a left side of the lane on which the host vehicle is located, which may cause grouping errors. Therefore, it is necessary to modify the grouping information so as to avoid the grouping errors caused by the rapid turning of the host vehicle.

In some embodiments, during modifying the grouping information, the intelligent driving system modifies the grouping information based on the historical traffic stream information. The historical traffic stream information is generated by fitting the last determination period. The determination period is a period for determining traffic stream information set in advance by the intelligent driving system. In practical applications, the determination period can be set based on the requirements of an application scenario for a refresh rate of a fitting result. The value is ranged between several tens of milliseconds and several seconds. For example, the determination period is set to be 5 seconds. Each group corresponds to a traffic stream, i.e., a piece of historical traffic stream information corresponds to a group. Herein, the historical traffic stream information includes a value of a fitting parameter, and the fitting parameter includes a quadratic term, a monomial term and a constant term. If the quadratic term exists, the historical traffic stream information corresponds to a curve. If the quadratic term is zero and the monomial term is not zero, the historical traffic stream information corresponds to a straight line. In some embodiments, the historical traffic stream information further includes a confidence level indicative of a degree of confidence in the traffic stream. If there is no historical traffic stream information, for example, the intelligent driving system has not stored the historical traffic stream information when the host vehicle moves out of the garage and enters a low speed lane, then the confidence level of the historical traffic stream information is zero and the grouping information is not modified.

In some embodiments, when the grouping information is modified based on the historical traffic stream information, the intelligent driving system judges whether a target vehicle exists within a preset range around the historical traffic stream information, and if so, modifies the group of the target vehicle into a group corresponding to the historical traffic stream information. The preset range can be set according to actual needs, and this embodiment does not define the specific value of the preset range. For example, the grouping of a certain target vehicle is a second lane group on a left side, and the target vehicle is located within the preset range around the historical traffic stream information corresponding to a first lane group on the left side. Therefore, the grouping of the target vehicle is modified from the second lane group on the left side to the first lane group on the left side.

In some embodiments, after modifying the grouping information based on the historical traffic stream information, the intelligent driving system caches vehicles satisfying the cache condition in each modified group. In a next determination period, the cached vehicles are historical vehicles. In some embodiments, the cache time may be set. The cache time may be set based on actual needs. This embodiment does not define the specific value of the cache time.

Herein, the cache condition is used for screening vehicles which travel in the same direction as the host vehicle and do not belong to other groups. It should be noted that, for each determination period, the intelligent driving system caches the vehicles satisfying the caching condition in each modified group in the determination period, namely, the caching opportunity is within the determination period.

In step 402, the intelligent driving system determines a fitting weight for each of the target vehicles based on the state information and the grouping information of each of the target vehicles.

In some embodiments, in the determining the fitting weight for each of the target vehicles, the intelligent driving system, for each of the target vehicles, determines a lateral speed deviation weight of the target vehicle, a lateral displacement deviation weight of the target vehicle, a life cycle weight of the target vehicle, and a speed weight of the target vehicle based on the state information of the target vehicle and the grouping information of the target vehicle; and multiplies the lateral speed deviation weight of the target vehicle, the lateral displacement deviation weight of the target vehicle, the life cycle weight of the target vehicle, and the speed weight of the target vehicle to obtain the fitting weight of the target vehicle.

Herein, the lateral speed deviation weight of the target vehicle is calculated by calculating an average lateral speed of all target vehicles in the group to which the target vehicle belongs; calculating a lateral speed deviation weight of the target vehicle based on the lateral speed of the target vehicle and the average lateral speed. In the present embodiment, the larger the lateral speed of the target vehicle deviates from the average lateral speed, the lower the lateral speed deviation weight is.

The lateral displacement deviation weight of the target vehicle is calculated by calculating an average lateral displacement of all target vehicles in the group to which the target vehicle belongs; and calculating a lateral displacement deviation weight of the target vehicle based on the lateral displacement of the target vehicle and the average lateral displacement. In the present embodiment, the further the lateral displacement of the target vehicle deviates from the average lateral displacement, the lower the lateral displacement deviation weight is.

The life cycle weight of the target vehicle is calculated by calculating a life cycle weight of the target vehicle based on the life cycle of the target vehicle and/or the target confidence level. In the present embodiment, the longer the life cycle of the target vehicle is, the higher the life cycle weight is. The higher the target confidence of the target vehicle is, the higher the life cycle weight is.

The speed weight of the target vehicle is calculated by the manner below. If there is no historical traffic stream information corresponding to the group of the target vehicle, the speed weight of the target vehicle is 1.

In some embodiments, the lateral displacement deviation weight of the target vehicle may be determined in conjunction with the historical traffic stream information. Specifically, a lateral displacement deviation weight of the target vehicle is calculated based on the lateral displacement of the target vehicle and the historical traffic stream information corresponding to the group of the target vehicle. In the present embodiment, the further the lateral displacement of the target vehicle deviates from the historical traffic stream, the lower the lateral displacement deviation weight is.

In some embodiments, the speed weight of the target vehicle may be determined in conjunction with the historical traffic stream information. Specifically, a traveling speed of the target vehicle is synthesized on the basis of a lateral speed and a longitudinal speed of the target vehicle, so that a travel direction of the target vehicle is determined. Thus, the speed weight of the target vehicle is calculated based on the travel direction of the target vehicle and the historical traffic stream information corresponding to the grouping of the target vehicle. In the present embodiment, the larger the included angle between the travel direction of the target vehicle and the tangential direction of the historical traffic stream is, the lower the speed weight of the target vehicle is.

In some embodiments, after grouping each effective target vehicle to obtain grouping information, and modifying the grouping information by the historical traffic stream information, the intelligent driving system determines a fitting weight for each effective target vehicle based on the historical traffic stream information, the state information of each effective target vehicle, and the modified grouping information.

In step 403, the intelligent driving system generates, by fitting, one or more pieces of current traffic stream information based on the motion information of the host vehicle, the state information of each of the target vehicles, the fitting weight and the grouping information of each of the target vehicles.

In some embodiments, each group corresponds to a traffic stream. For a group, the intelligent driving system generates, by fitting, current traffic stream information corresponding to the group, in particular, selects a fit method based on the number of target vehicles in the group and the longitudinal distribution distance of all target vehicles in the group; and generates, by fitting, current traffic stream information corresponding to the group based on the selected fit method and by using the motion information of the host vehicle, the state information of each of the target vehicles in the group and the fitting weight of each of the target vehicles in the group.

The traffic stream obtained by grouping and fitting the first left lane is called a left-side traffic stream information of the host vehicle. The traffic stream obtained by grouping and fitting the right first lane is called a right-side traffic stream information of the host vehicle.

In some embodiments, in selecting the fit mode, the intelligent driving system judges whether the number of target vehicles in the group satisfies a first number condition and whether the longitudinal distribution distance is greater than a preset first distance threshold. The first number condition is, for example, 3. The first distance threshold is, for example, 50 meters. Over-fitting is avoided (for example, the traffic stream is actually a straight line, but fitting is performed in a curve manner), and the specific values of the first number condition and the first distance threshold can be set according to actual needs.

If the first number condition is satisfied and the longitudinal distribution distance is greater than the preset first distance threshold, selecting a first-order fitting and a second-order fitting; otherwise, judging whether the number of target vehicles in the group satisfies a second number condition and whether the longitudinal distribution distance is greater than a preset second distance threshold. Herein, the second number condition is, for example, greater than or equal to 2 and less than 4, and the second distance threshold is, for example, 30 meters. The specific values of the first number condition and the first distance threshold can be set according to actual needs.

If the second number condition is satisfied and the longitudinal distribution distance is greater than a preset second distance threshold, a first-order fitting is selected; otherwise, no fitting is made, and the data of the last traffic stream information determination period is continued.

In some embodiments, if a first-order fitting and a second-order fitting are selected, the intelligent driving system generates, by fitting, current traffic stream information corresponding to the group. At the moment, the intelligent driving system generates, by fitting, a first-order fitting result corresponding to the group, and determines a first mean square error of the first-order fitting result; generates, by fitting, a second-order fitting result corresponding to the grouping, and determines a second mean square error of the second-order fitting result; then compares the first mean square error and the second mean square error. If the first mean square error is greater than a preset multiple of the second mean square error (for example, 1.5 times, the preset multiple can also be set according to actual situations), a second-order fitting result is selected as current traffic stream information corresponding to the group. Otherwise, the first-order fitting result is selected as the current traffic stream information corresponding to the group.

In some embodiments, when the current traffic stream information corresponding to the group is generated, by fitting, by using the motion information of the host vehicle, the state information of each of the target vehicles in the group and the fitting weight of each of the target vehicles in the group, the intelligent driving system generates, by the fitting, initial traffic stream information corresponding to the group based on the state information of each of the target vehicles in the group and the fitting weight of each of the target vehicles in the group; and constrains the initial traffic stream information based on the historical traffic stream information and the motion information of the host vehicle to obtain current traffic stream information corresponding to the group.

In some embodiments, the constraining the initial traffic stream information includes at least one of a position constraint, a heading constraint and a curvature constraint.

In some embodiments, the position constraint comprises constraining a variable quantity of a constant term in a fitting parameter corresponding to the initial traffic stream information based on a confidence level corresponding to the historical traffic stream information; wherein the relationship between the variable quantity of the constant item and the confidence level corresponding to the historical traffic stream information is an inverse correlation; and the relationship between the variable quantity of the constant term and the fitting quantity corresponding to the initial traffic stream information is a positive correlation. Here, the fitting quantity can be understood as the quantity of target vehicles participating in the fitting.

In some embodiments, the heading constraint comprises constraining a variable quantity of a monomial term in the fitting parameter corresponding to the initial traffic stream information based on the confidence level corresponding to the historical traffic stream information and/or the motion information of the host vehicle; wherein the relationship between the variable quantity of the monomial term and the confidence level corresponding to the historical traffic stream information is an inverse correlation, the relationship between the variable quantity of the monomial term and a steering range of the host vehicle is a positive correlation, and/or the relationship between the variable quantity of the monomial term and the fitting quantity corresponding to the initial traffic stream information is a positive correlation.

In some embodiments, the curvature constraint comprises constraining a variable quantity of a quadratic term in the fitting parameter corresponding to the initial traffic stream information based on the confidence level corresponding to the historical traffic stream information and/or the motion information of the host vehicle; wherein the relationship between the variable quantity of the quadratic term and the confidence level corresponding to the historical traffic stream information is an inverse correlation, the relationship between the variable quantity of the quadratic term and the speed of the host vehicle is an inverse correlation, and/or the relationship between the variable quantity of the quadratic term and a speed of a steering wheel of the host vehicle is a positive correlation.

In some embodiments, each group corresponds to a traffic stream. For a group, before generating, by fitting, the current traffic stream information corresponding to the grouping, for example, after grouping each of the target vehicles to obtain grouping information, the intelligent driving system ensures that the number of target vehicles in the grouping satisfies a preset fitting quantity. Otherwise, the fitting cannot be performed. Therefore, the intelligent driving system judges whether the number of target vehicles satisfies a preset fitting quantity; if so, judges whether the travel state of the host vehicle is straight; if it is straight, the cached historical vehicles are acquired. The acquired historical vehicles may be one or more, and the acquired historical vehicles belong to the group.

In some embodiments, the historical vehicle satisfies a cache condition. The cache condition is used for screening vehicles which travel in the same direction as the host vehicle and do not belong to other groups.

In some embodiments, the caching conditions include (1) to (3) below.

(1) The vehicle is located in front of the host vehicle and the relative distance to the host vehicle is greater than a preset relative distance threshold. The preset relative distance threshold value is, for example, 20 meters. The present embodiment does not define the specific value of the relative distance threshold value, which can be set by a person skilled in the art according to actual needs. It will be appreciated that judging whether a vehicle satisfies a cache condition is based on judging the relative relationship between the vehicle and the host vehicle at the time, including relative distance, direction of travel, lateral distance, etc.

(2) The angle between the direction of the speed of the vehicle relative to the host vehicle and the direction of travel of the host vehicle is less than a preset angle threshold. The direction of the speed of the vehicle relative to the host vehicle can be understood as the travel direction of the vehicle. The travel direction of the vehicle may be determined by synthesizing the speed (i.e., travel speed) of the vehicle based on the lateral speed and the longitudinal speed of the vehicle at the time of judging.

(3) The lateral distance of the vehicle relative to the host vehicle is within a preset lateral distance range. The preset lateral distance range is, for example, 2 meters to 3 meters. This embodiment does not define the specific value of the lateral distance range, and a person skilled in the art would have been able to set same according to actual needs.

In some embodiments, the cache conditions may also include (4) below.

(4) The life cycle of the vehicle is greater than a preset life cycle threshold. Herein, the preset life cycle threshold value is, for example, 3 seconds. This embodiment does not define the specific value of the life cycle threshold value, and a person skilled in the art would have been able to set same according to actual needs.

In some embodiments, after obtaining the cached historical vehicles, the intelligent driving system updates the coordinates of each historical vehicle to obtain the virtual vehicle corresponding to each historical vehicle and the state information of each of the virtual vehicles. The way to update the coordinates includes, for example, calculating a time difference between the cache time and the current time of the historical vehicle, and updating coordinates using the state information of the historical vehicle and the calculated time difference. Specifically, a travel speed of the historical vehicle is synthesized by a lateral speed and a longitudinal speed in the state information of the historical vehicle, and the coordinates are updated based on the travel speed and the calculated time difference. The state information of the historical vehicle is the state information corresponding to the historical vehicle when the historical vehicle is cached.

In some embodiments, the state information of the virtual vehicle includes, but is not limited to, at least one of a lateral displacement, a longitudinal displacement, a lateral speed, a longitudinal speed, and the like of the virtual vehicle relative to the host vehicle. The lateral displacement and the longitudinal displacement are determined based on the aforementioned coordinate update. The lateral speed and the longitudinal speed are the same as the lateral speed and the longitudinal speed of the corresponding historical vehicle. In some embodiments, the state information of the virtual vehicle may also include, but is not limited to, one or more of identification (ID), a sensing type, a life cycle, and target confidence level, etc. that are the same as the historical vehicle to which the virtual vehicle corresponds. For example, the sensing type of the virtual vehicle is the sensing type of the corresponding historical vehicle. The grouping information of the virtual vehicles is the same as the grouping information of the corresponding historical vehicles.

In some embodiments, when the travel state of the host vehicle is not straight, the historical vehicle is not screened, because the relative relationship between the historical vehicle and the host vehicle cannot be determined, and the coordinates of the historical vehicle cannot be updated to obtain the virtual vehicle. Even if the coordinates of the historical vehicle are updated to obtain the virtual vehicle, the relative relationship between the historical vehicle and the host vehicle is uncertain, so that the relative relationship between the virtual vehicle and the host vehicle is uncertain, and thus the state information of the virtual vehicle cannot be determined.

In some embodiments, after determining the virtual vehicles and the state information of the virtual vehicles, the intelligent driving system may determine a fitting weight for each of the virtual vehicles based on the historical traffic stream information, the motion information of the host vehicle, the state information of each of the virtual vehicles, and grouping information of each of the virtual vehicles.

In some embodiments, in the determining a fitting weight for each of the virtual vehicles, the intelligent driving system, for each of the virtual vehicles, determines a lateral speed deviation weight of the virtual vehicle, a lateral displacement deviation weight of the virtual vehicle, a life cycle weight of the virtual vehicle, a speed weight of the virtual vehicle, and a weight of the virtual vehicle based on the state information of the virtual vehicle and the grouping information of the virtual vehicle; and then multiplies the lateral speed deviation weight of the virtual vehicle, the lateral displacement deviation weight of the virtual vehicle, the life cycle weight of the virtual vehicle, the speed weight of the virtual vehicle, and the weight of the virtual vehicle to obtain the fitting weight of the virtual vehicle.

The calculation methods of the lateral speed deviation weight of the virtual vehicle, the lateral displacement deviation weight of the virtual vehicle, the life cycle weight of the virtual vehicle, and the speed weight of the virtual vehicle are respectively the same as the calculation methods of the lateral speed deviation weight of the target vehicle, the lateral displacement deviation weight of the target vehicle, the life cycle weight of the target vehicle, and the speed weight of the target vehicle, and will not be described in detail. The weight of the virtual vehicle is calculated based on the cache time of the virtual vehicle. The longer the cache time of the virtual vehicle is, the lower the weight of the virtual vehicle is.

In some embodiments, after determining the virtual vehicles and the state information of the virtual vehicles, the intelligent driving system generates, by the fitting, one or more pieces of current traffic stream information based on the state information of each of the target vehicles, the fitting weight of each of the target vehicles, the state information of each of the virtual vehicles, and the fitting weight of each of the virtual vehicles. The process of generation by fitting is similar to the aforementioned process of fitting only based on the target vehicle, and will not be described in detail herein.

In some embodiments, after generating, by fitting, the current traffic stream information, the intelligent driving system may determine a confidence level increment based on the current traffic stream information; and determine the confidence level corresponding to the current traffic stream information based on the confidence level and the confidence level increment of the historical traffic stream information. For example, a confidence level based on the historical traffic stream information is added to a confidence level increment to obtain a confidence level corresponding to the current traffic stream information. It should be noted that the current traffic stream information and the historical traffic stream information both correspond to the same group so as to determine the confidence level corresponding to the current traffic stream information in the manner of the present embodiment.

In some embodiments, the relationship between the confidence level increment and the mean square error of the fitting result corresponding to the current traffic stream information is an inverse correlation, the relationship between the confidence level increment and the fitting quantity corresponding to the current traffic stream information is a positive correlation, and/or the relationship between the confidence level increment and the longitudinal distribution distance of the target vehicle (if there is a virtual vehicle, the virtual vehicle should also be taken into account) corresponding to the current traffic stream information is a positive correlation.

In some embodiments, in the determining a confidence level increment, the intelligent driving system determines whether two pieces of current traffic stream information intersects. If so, it compares the fitting quantity and the longitudinal distribution distance corresponding to the two pieces of traffic stream; and determines the confidence level increment corresponding to the current traffic stream information with a less fitting quantity or a shorter longitudinal distribution distance to be negative. For example, the intelligent driving system determines whether there is an intersection between the traffic stream on the left side of the host vehicle and the traffic stream on the right side of the host vehicle. If two pieces of current traffic stream information intersects, it compares the fitting quantity and the longitudinal distribution distance corresponding to the two pieces of traffic stream; and determines the confidence level increment corresponding to the current traffic stream information with a less fitting quantity or a shorter longitudinal distribution distance to be negative.

In some embodiments, the confidence level increment is determined to be negative if the current traffic stream information determination period is not fitted. This negative value will be accumulated to the confidence level in the corresponding historical traffic stream information.

In some embodiments, the intelligent driving system may determine a travel reference path of the host vehicle based on the current traffic stream information and the confidence level corresponding to the current traffic stream information. The determining the travel reference path of the host vehicle includes:
  if the confidence levels corresponding to the current traffic stream information on both sides of the host vehicle are both higher than a preset confidence level threshold, determining that the parameter of the travel reference path of the host vehicle is a weighted average value of the fitting parameter corresponding to the current traffic stream information on both sides of the host vehicle; wherein the relationship between the weight of the fitting parameter corresponding to the current traffic stream information on both sides of the host vehicle and the change rate of the fitting parameter is an inverse correlation;
  if the confidence level corresponding to the current traffic stream information on only one side of the host vehicle is higher than a preset confidence level threshold, determining that the monomial term and the quadratic term in the parameter of the travel reference path of the host vehicle are the same as the monomial term and the quadratic term in the fitting parameter corresponding to the current traffic stream information on the side, wherein the constant term in the parameter of the travel reference path of the host vehicle is zero;

if the confidence levels corresponding to the current traffic stream information on both sides of the host vehicle are both lower than the preset confidence level threshold, determining that the parameters of the travel reference path of the host vehicle are all zero.

In some embodiments, the intelligent driving system may determine an auxiliary location marker based on the current traffic stream information and the confidence level corresponding to the current traffic stream information. Herein, the auxiliary location marker is used to assist in determining the lane on which the host vehicle is located. The auxiliary location marker is independent of the lane line information, and can help determine the lane of the host vehicle when the lane line is not enough to determine the unique lane in some multi-lane scenes, which provides the necessary basis for the long-distance path planning of L3 automatic driving system.

In some embodiments, the determining an auxiliary location marker includes:

if the confidence levels corresponding to the current traffic stream information on both sides of the host vehicle are both higher than the preset confidence level threshold, determining the auxiliary location marker as a first marker. The first marker indicates that there are lanes on both sides of the host vehicle. The auxiliary location marker may be a flag bit. The value of the flag bit corresponding to the first mark is, for example, 1. When the intelligent driving system determines that the auxiliary location marker is 1, it is determined that lanes exist on both sides of the host vehicle.

If the confidence level corresponding to the current traffic stream information on the left side of the host vehicle is higher than the preset confidence level threshold, the auxiliary location marker is determined as a second marker. The second marker represents that a lane exists on the left side of the host vehicle. The value of the flag bit corresponding to the second marker is, for example, 2.

If the confidence level corresponding to the current traffic stream information on the right side of the host vehicle is higher than the preset confidence level threshold, the auxiliary location marker is determined as a third marker. The third marker represents that a lane exists on the right side of the host vehicle. The value of the flag bit corresponding to the third marker is, for example, 3.

In some embodiments, the intelligent driving system may perform the host vehicle lateral control based on the current traffic stream information, get rid of the dependence on the lane line information, and facilitate maintaining the host vehicle lateral control in a congested environment. Transverse control based on a path is a mature technical means in the art, and will not be described in detail here.

It is noted that each of the foregoing method embodiments, for purposes of simplicity of description, is presented as a series of combinations of acts, but those of skill in the art will understand that the disclosed embodiments are not limited by the order of acts described, as some steps may occur in other orders or concurrently with other acts in accordance with the disclosed embodiments. Moreover, those skilled in the art will appreciate that the embodiments described in the description are all alternatives.

Embodiments of the present disclosure also provide a non-transitory computer-readable storage medium storing programs or instructions that cause a computer to perform, such as, the steps of embodiments of the method for determining traffic stream information, which will not be described in detail herein to avoid redundant description.

Figure 5:
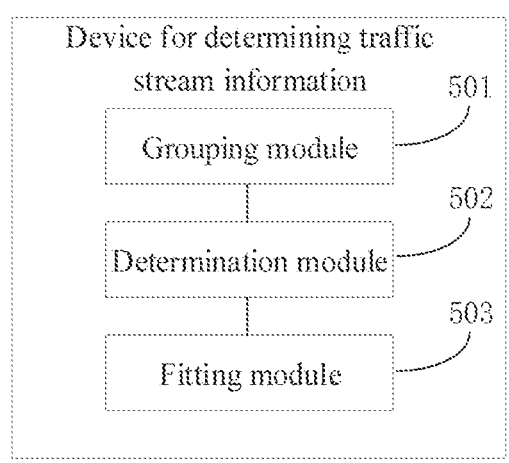
FIG. 5 is an exemplary block diagram of a device for determining traffic stream information provided by an embodiment of the present disclosure.

FIG. 5 is an exemplary block diagram of a device for determining traffic stream information provided by an embodiment of the present disclosure. As shown in FIG. 5, the device for determining traffic stream information includes, but is not limited to, a grouping module 501, a determination module 502, and a fitting module 503.

In FIG. 5, the grouping module 501 is configured for grouping each of target vehicles based on motion information of a host vehicle and state information of one or more of the target vehicles to obtain grouping information.

The determination module 502 is configured for determining a fitting weight for each of the target vehicles based on the state information and the grouping information for each of the target vehicles.

The fitting module 503 is configured for generating, by the fitting, one or more pieces of current traffic stream information based on the motion information of the host vehicle, the state information of each of the target vehicles, the fitting weights and the grouping information of each of the target vehicles.

In some embodiments, the grouping module 501 is configured for determining a travel trajectory of the host vehicle based on the motion information of the host vehicle; filtering one or more effective target vehicles based on the motion information of the host vehicle and the state information of each of the target vehicles; and grouping each of the effective target vehicles based on the travel trajectory of the host vehicle and the state information of each of the effective target vehicles to obtain grouping information.

In some embodiments, the grouping module 501 is further configured for modifying the grouping information based on the historical traffic stream information after the grouping information is obtained; accordingly, the determination module 502 is configured for determining a fitting weight for each of the effective target vehicles based on the historical traffic stream information, the state information of each of the effective target vehicles, and the modified grouping information.

In some embodiments, the grouping module 501, for each the effective target vehicle, determines a relative lane on which the effective target vehicle is located based on the state information of the effective target vehicle and the travel trajectory of the host vehicle; and determines grouping information for the effective target vehicle based on the relative lanes.

In some embodiments, the grouping information comprises the following five groups: a first lane group on a left side of the lane on which the host vehicle is located, a second lane group on a left side of the lane on which the host vehicle is located, a first lane group on a right side of the lane on which the host vehicle is located, a second lane group on a right side of the lane on which the host vehicle is located, and other groups.

In some embodiments, the fitting module 503 is further configured for judging whether the number of target vehicles satisfies a preset fitting quantity before generating, by the fitting, one or more pieces of current traffic stream information; if so, judging whether the travel state of the host vehicle is straight; acquiring cached historical vehicles if the travel state of the host vehicle is straight; updating coordinates of each of the historical vehicles to obtain virtual vehicles corresponding to each of the historical vehicles and state information of each of the virtual vehicles; and determining a fitting weight for each of the virtual vehicles based on the historical traffic stream information, the motion information of the host vehicle, the state information of each of the virtual vehicles, and grouping information of each of the virtual vehicles.

Accordingly, the fitting module 503 is configured for generating, by the fitting, one or more pieces of current traffic stream information based on the state information of each of the target vehicles, the fitting weight of each of the target vehicles, the state information of each of the virtual vehicles, and the fitting weight of each of the virtual vehicles.

In some embodiments, the historical vehicle satisfies a cache condition, wherein the cache condition is used for screening vehicles which travel in the same direction as the host vehicle and do not belong to other groups.

In some embodiments, the cache condition includes: the vehicle is located in front of the host vehicle and the relative distance to the host vehicle is greater than a preset relative distance threshold. The angle between the direction of the speed of the vehicle relative to the host vehicle and the direction of travel of the host vehicle is less than a preset angle threshold; and the lateral distance of the vehicle relative to the host vehicle is within a preset lateral distance range.

In some embodiments, the cache condition further comprises that the life cycle of the vehicle is greater than a preset life cycle threshold.

In some embodiments, the determination module 502 determines, for each of the target vehicles, a lateral speed deviation weight of the target vehicle, a lateral displacement deviation weight of the target vehicle, a life cycle weight of the target vehicle, and a speed weight of the target vehicle based on the state information of the target vehicle and the grouping information of the target vehicle; and multiplies the lateral speed deviation weight of the target vehicle, the lateral displacement deviation weight of the target vehicle, the life cycle weight of the target vehicle, and the speed weight of the target vehicle to obtain the fitting weight of the target vehicle.

In some embodiments, the determination module 502 determines, for each of the virtual vehicles, determines a lateral speed deviation weight of the virtual vehicle, a lateral displacement deviation weight of the virtual vehicle, a life cycle weight of the virtual vehicle, a speed weight of the virtual vehicle, and a weight of the virtual vehicle based on the state information of the virtual vehicle and the grouping information of the virtual vehicle; and then multiplies the lateral speed deviation weight of the virtual vehicle, the lateral displacement deviation weight of the virtual vehicle, the life cycle weight of the virtual vehicle, the speed weight of the virtual vehicle, and the weight of the virtual vehicle to obtain the fitting weight of the virtual vehicle.

In some embodiments, each group corresponds to a traffic stream. The fitting module 503, for one group, selects a fit method based on the number of target vehicles in the group and the longitudinal distribution distance of all target vehicles in the group; and generates, by fitting, current traffic stream information corresponding to the group based on the selected fit method and by using the motion information of the host vehicle, the state information of each of the target vehicles in the group and the fitting weight of each of the target vehicles in the group.

In some embodiments, the fitting module 503 selects a fitting manner based on the number of target vehicles in the group and the longitudinal distribution distance of all target vehicles in the group, including; judging whether the number of target vehicles in the group satisfies a first number condition and whether the longitudinal distribution distance is greater than a preset first distance threshold; if the first number condition is satisfied and the longitudinal distribution distance is greater than the preset first distance threshold, selecting a first-order fitting and a second-order fitting; otherwise, judging whether the number of target vehicles in the group satisfies a second number condition and whether the longitudinal distribution distance is greater than a preset second distance threshold; and if the second number condition is satisfied and the longitudinal distribution distance is greater than a preset second distance threshold, selecting a first-order fitting; otherwise, making no fitting.

In some embodiments, if a first-order fitting and a second-order fitting are selected, the fitting module 503 generates, by fitting, current traffic stream information corresponding to the group, including generating, by fitting, a first-order fitting result corresponding to the group, and determining a first mean square error of the first-order fitting result; generating, by fitting, a second-order fitting result corresponding to the group, and determining a second mean square error of the second-order fitting result; then comparing the first mean square error and the second mean square error. If the first mean square error is greater than a preset multiple of the second mean square error, a second-order fitting result is selected as current traffic stream information corresponding to the group. Otherwise, the first-order fitting result is selected as the current traffic stream information corresponding to the group.

In some embodiments, the fitting module 503 generates, by fitting, the current traffic stream information corresponding to the group by using the motion information of the host vehicle, the state information of each of the target vehicles in the group and the fitting weight of each of the target vehicles in the group, including generating, by the fitting, initial traffic stream information corresponding to the group based on the state information of each of the target vehicles in the group and the fitting weight of each of the target vehicles in the group; and constraining the initial traffic stream information based on the historical traffic stream information and the motion information of the host vehicle to obtain current traffic stream information corresponding to the group.

In some embodiments, the constraint includes at least one of a position constraint, a heading constraint and a curvature constraint.

In some embodiments, the position constraint includes constraining a variable quantity of a constant term in a fitting parameter corresponding to the initial traffic stream information based on a confidence level corresponding to the historical traffic stream information; the relationship between the variable quantity of the constant item and the confidence level corresponding to the historical traffic stream information is an inverse correlation; and the relationship between the variable quantity of the constant term and the fitting quantity corresponding to the initial traffic stream information is a positive correlation.

In some embodiments, the heading constraint includes constraining a variable quantity of a monomial term in the fitting parameter corresponding to the initial traffic stream information based on the confidence level corresponding to the historical traffic stream information and/or the motion information of the host vehicle; wherein the relationship between the variable quantity of the monomial term and the confidence level corresponding to the historical traffic stream information is an inverse correlation, the relationship between the variable quantity of the monomial term and a steering range of the host vehicle is a positive correlation, and/or the relationship between the variable quantity of the monomial term and the fitting quantity corresponding to the initial traffic stream information is a positive correlation.

In some embodiments, the curvature constraint includes constraining a variable quantity of a quadratic term in the fitting parameter corresponding to the initial traffic stream information based on the confidence level corresponding to the historical traffic stream information and/or the motion information of the host vehicle; wherein the relationship between the variable quantity of the quadratic term and the confidence level corresponding to the historical traffic stream information is an inverse correlation, the relationship between the variable quantity of the quadratic term and the speed of the host vehicle is an inverse correlation, and/or the relationship between the variable quantity of the quadratic term and a speed of a steering wheel of the host vehicle is a positive correlation.

In some embodiments, the device for determining traffic stream information further includes a confidence level determination unit, not shown in FIG. 5, configured for determining a confidence level increment based on the current traffic stream information; and determining a confidence level corresponding to the current traffic stream information based on the confidence level of the historical traffic stream information and the confidence level increment. The relationship between the confidence level increment and the mean square error of the fitting result corresponding to the current traffic stream information is an inverse correlation, the relationship between the confidence level increment and the fitting quantity corresponding to the current traffic stream information is a positive correlation, and/or the relationship between the confidence level increment and the longitudinal distribution distance of the target vehicle corresponding to the current traffic stream information is a positive correlation.

The confidence level determination unit is used for determining a confidence level increment based on the current traffic stream information comprises: if two pieces of current traffic stream information intersects, then comparing the fitting quantity and the longitudinal distribution distance corresponding to the two pieces of traffic stream; and determining the confidence level increment corresponding to the current traffic stream information with a less fitting quantity or a shorter longitudinal distribution distance to be negative.

In some embodiments, the device for determining traffic stream information further includes a reference path determination unit, not shown in FIG. 5, for determining a travel reference path of the host vehicle based on the current traffic stream information and the confidence level corresponding to the current traffic stream information. The determining a travel reference path of the host vehicle includes: if the confidence levels corresponding to the current traffic stream information on both sides of the host vehicle are both higher than a preset confidence level threshold, determining that the parameter of the travel reference path of the host vehicle is a weighted average value of the fitting parameter corresponding to the current traffic stream information on both sides of the host vehicle; wherein the relationship between the weight of the fitting parameter corresponding to the current traffic stream information on both sides of the host vehicle and the change rate of the fitting parameter is an inverse correlation; if the confidence level corresponding to the current traffic stream information on only one side of the host vehicle is higher than a preset confidence level threshold, determining that the monomial term and the quadratic term in the parameter of the travel reference path of the host vehicle are the same as the monomial term and the quadratic term in the fitting parameter corresponding to the current traffic stream information on the side, wherein the constant term in the parameter of the travel reference path of the host vehicle is zero; if the confidence levels corresponding to the current traffic stream information on both sides of the host vehicle are both lower than the preset confidence level threshold, determining that the parameters of the travel reference path of the host vehicle are all zero.

In some embodiments, the device for determining traffic stream information further includes an auxiliary location marker determination unit, not shown in FIG. 5, for determining an auxiliary location marker based on the current traffic stream information and the confidence level corresponding to the current traffic stream information. The determining an auxiliary location marker includes: if the confidence levels corresponding to the current traffic stream information on both sides of the host vehicle are both higher than the preset confidence level threshold, determining the auxiliary location marker as a first marker; if the confidence level corresponding to the current traffic stream information on the left side of the host vehicle is higher than the preset confidence level threshold, determining the auxiliary location marker as a second marker; and if the confidence level corresponding to the current traffic stream information on the right side of the host vehicle is higher than the preset confidence level threshold, determining the auxiliary location marker as a third marker.

In some embodiments, the division of each unit in the device for determining traffic stream information is only a logical function division, and there may be other division manners in actual implementation. For example, at least two units of the grouping module 501, the determination module 502 and the fitting module 503 may be implemented as one unit. The grouping module 501, the determination module 502 or the fitting module 503 may also be divided into a plurality of sub-units. It will be understood that each unit or sub-unit can be implemented in electronic hardware, or a combination of computer software and electronic hardware. Whether such functionality is implemented as hardware or software depends upon the particular application and design constraints imposed on the implementation. Those skilled in the art may implement the described functionality in varying ways for each particular application.

It should be noted that, as used herein, the terms "comprises", "comprising", or any other variation thereof, are intended to cover a non-exclusive inclusion, such that a process, method, article, or device that includes a list of elements does not include only those elements but may include other elements not expressly listed or inherent to such process, method, article, or device. An element proceeded by the phrase "comprising . . . " does not, without more constraints, preclude the existence of additional identical elements in the process, method, article, or device that includes the element.

It will be appreciated by those skilled in the art that although some embodiments described herein include some but not other features included in other embodiments, combinations of features of different embodiments are intended to be within the scope of the present disclosure and form different embodiments.

It will be appreciated by those skilled in the art that the various embodiments have been described with a particular emphasis. If there is a part not specified in an embodiment, reference will be made to the description of the other embodiments.

Although implementations of the present disclosure have been described with reference to the accompanying drawings, various modifications and changes may be made by those skilled in the art without departing from the spirit and scope of the disclosure, and it is intended that such modifications and changes come within the scope of the appended claims.

INDUSTRIAL APPLICABILITY

In at least one embodiment of the present disclosure, by grouping a plurality of target vehicles and determining the fitting weight of each of the target vehicles, the method can generate the current traffic stream information by fitting based on the grouping information, the fitting weight, the motion information of the host vehicle and the state information of the target vehicle, so as to achieve the sensing of traffic stream. The disclosed embodiments can determine an auxiliary location marker based on the current traffic stream information and the confidence level corresponding to the current traffic stream information. The auxiliary location marker is independent of the lane line information, and can help determine the lane of the host vehicle when the lane line is not enough to determine the unique lane in some multi-lane scenes, which provides the necessary basis for the long-distance path planning of L3 automatic driving system. In addition, the disclosed embodiment may perform the host vehicle lateral control based on the current traffic stream information, get rid of the dependence on the lane line information, and facilitate maintaining the host vehicle lateral control in a congested environment. It has industrial applicability.

What is claimed is:

1. A method for determining traffic stream information, comprising:
   grouping each of target vehicles based on motion information of a host vehicle and state information of one or more of the target vehicles to obtain grouping information;
   determining a fitting weight for each of the target vehicles based on the state information and the grouping information for each of the target vehicles; and
   generating, by the fitting, one or more pieces of current traffic stream information based on the motion information of the host vehicle, the state information of each of the target vehicles, the fitting weights and the grouping information of each of the target vehicles;
   wherein, each group corresponds to a traffic stream; the generating, by the fitting, one or more pieces of current traffic stream information comprises:
   for one of the groups:
   selecting a fit method based on the number of target vehicles in the group and the longitudinal distribution distance of all target vehicles in the group;
   generating, by fitting, current traffic stream information corresponding to the group based on the selected fit method and by using the motion information of the host vehicle, the state information of each of the target vehicles in the group and the fitting weight of each of the target vehicles in the group; and
   performing lateral control of the host vehicle based on current traffic stream information.

2. The method according to claim 1, wherein, the grouping each of target vehicles based on motion information of a host vehicle and state information of one or more of the target vehicles to obtain grouping information comprises:
   determining a travel trajectory of the host vehicle based on the motion information of the host vehicle;
   filtering one or more effective target vehicles based on the motion information of the host vehicle and the state information of each of the target vehicles; and
   grouping each of the effective target vehicles based on the travel trajectory of the host vehicle and the state information of each of the effective target vehicles to obtain grouping information, comprising: for each of the effective target vehicle, determining a relative lane on which the effective target vehicle is located based on the state information of the effective target vehicle and the travel trajectory of the host vehicle; and determining the grouping information for the effective target vehicle based on the relative lane;
   wherein, after obtaining the grouping information, the method further comprises:
   modifying the grouping information based on historical traffic stream information; and
   accordingly, determining the fitting weight for each of the effective target vehicles based on the historical traffic stream information, the state information of each of the effective target vehicles, and the modified grouping information.

3. The method according to claim 1, wherein, the grouping information comprises the following five groups: a first lane group on a left side of the lane on which the host vehicle is located, a second lane group on the left side of the lane on which the host vehicle is located, a first lane group on a right side of the lane on which the host vehicle is located, a second lane group on the right side of the lane on which the host vehicle is located, and other groups.

4. The method according to claim 3, wherein, before the generating, by the fitting, one or more pieces of current traffic stream information, the method further comprises:
   judging whether the number of target vehicles satisfies a preset fitting quantity; if so, judging whether the travel state of the host vehicle is straight;
   acquiring cached historical vehicles if the travel state of the host vehicle is straight;
   updating coordinates of each of the historical vehicles to obtain virtual vehicles corresponding to each of the historical vehicles and state information of each of the virtual vehicles;
   determining a fitting weight for each of the virtual vehicles based on the historical traffic stream information, the motion information of the host vehicle, the state information of each of the virtual vehicles, and grouping information of each of the virtual vehicles; and
   accordingly, the generating, by the fitting, one or more pieces of current traffic stream information comprises generating, by the fitting, one or more pieces of current traffic stream information based on the state information of each of the target vehicles, the fitting weight of each of the target vehicles, the state information of each of the virtual vehicles, and the fitting weight of each of the virtual vehicles.

5. The method according to claim 4, wherein, the historical vehicle satisfies a cache condition, wherein the cache condition is used for screening vehicles which travel in the same direction as the host vehicle and do not belong to other groups.

6. The method according to claim 5, wherein, the cache condition comprises the followings:
   the vehicle is located in front of the host vehicle and the relative distance to the host vehicle is greater than a preset relative distance threshold;

the angle between the direction of the speed of the vehicle relative to the host vehicle and the direction of travel of the host vehicle is less than a preset angle threshold; and the lateral distance of the vehicle relative to the host vehicle is within a preset lateral distance range.

7. The method according to claim 6, wherein, the cache condition further comprises that the life cycle of the vehicle is greater than a preset life cycle threshold.

8. The method according to claim 1, wherein, the determining a fitting weight for each of the target vehicles comprises:

for each of the target vehicles,
determining a lateral speed deviation weight of the target vehicle, a lateral displacement deviation weight of the target vehicle, a life cycle weight of the target vehicle, and a speed weight of the target vehicle based on the state information of the target vehicle and the grouping information of the target vehicle; and multiplying the lateral speed deviation weight of the target vehicle, the lateral displacement deviation weight of the target vehicle, the life cycle weight of the target vehicle, and the speed weight of the target vehicle to obtain the fitting weight of the target vehicle.

9. The method according to claim 4, wherein, the determining a fitting weight for each of the virtual vehicles comprises:

for each of the virtual vehicles,
determining a lateral speed deviation weight of the virtual vehicle, a lateral displacement deviation weight of the virtual vehicle, a life cycle weight of the virtual vehicle, a speed weight of the virtual vehicle, and a weight of the virtual vehicle based on the state information of the virtual vehicle and the grouping information of the virtual vehicle; and multiplying the lateral speed deviation weight of the virtual vehicle, the lateral displacement deviation weight of the virtual vehicle, the life cycle weight of the virtual vehicle, the speed weight of the virtual vehicle, and the weight of the virtual vehicle to obtain the fitting weight of the virtual vehicle.

10. The method according to claim 1, wherein, the selecting a fit method based on the number of target vehicles in the group and the longitudinal distribution distance of all target vehicles in the group comprises:

judging whether the number of target vehicles in the group satisfies a first number condition and whether the longitudinal distribution distance is greater than a preset first distance threshold;

if the first number condition is satisfied and the longitudinal distribution distance is greater than the preset first distance threshold, selecting a first-order fitting and a second-order fitting; otherwise, judging whether the number of target vehicles in the group satisfies a second number condition and whether the longitudinal distribution distance is greater than a preset second distance threshold; and if the second number condition is satisfied and the longitudinal distribution distance is greater than the preset second distance threshold, selecting a first-order fitting; otherwise, making no fitting.

11. The method according to claim 10, wherein, if the first-order fitting and the second-order fitting are selected, the generating, by fitting, current traffic stream information corresponding to the group comprises:

generating, by fitting, a first-order fitting result corresponding to the group, and determining a first mean square error of the first-order fitting result;

generating, by fitting, a second-order fitting result corresponding to the group, and determining a second mean square error of the second-order fitting result; and comparing the first mean square error and the second mean square error, and if the first mean square error is greater than a preset multiple of the second mean square error, selecting the second-order fitting result as the current traffic stream information corresponding to the group; otherwise, selecting the first-order fitting result as the current traffic stream information corresponding to the group.

12. The method according to claim 1, wherein, the generating, by fitting, current traffic stream information corresponding to the group by using the motion information of the host vehicle, the state information of each of the target vehicles in the group and the fitting weight of each of the target vehicles in the group comprises:

generating, by the fitting, initial traffic stream information corresponding to the group based on the state information of each of the target vehicles in the group and the fitting weight of each of the target vehicles in the group; and constraining the initial traffic stream information based on the historical traffic stream information and the motion information of the host vehicle to obtain current traffic stream information corresponding to the group.

13. The method according to claim 12, wherein, the constraint comprises at least one of a position constraint, a heading constraint and a curvature constraint;

wherein, the position constraint comprises constraining a variable quantity of a constant term in a fitting parameter corresponding to the initial traffic stream information based on a confidence level corresponding to the historical traffic stream information; wherein the relationship between the variable quantity of the constant item and the confidence level corresponding to the historical traffic stream information is an inverse correlation; and the relationship between the variable quantity of the constant term and the fitting quantity corresponding to the initial traffic stream information is a positive correlation;

wherein, the heading constraint comprises constraining a variable quantity of a monomial term in the fitting parameter corresponding to the initial traffic stream information based on the confidence level corresponding to the historical traffic stream information and/or the motion information of the host vehicle; wherein the relationship between the variable quantity of the monomial term and the confidence level corresponding to the historical traffic stream information is an inverse correlation, the relationship between the variable quantity of the monomial term and a steering range of the host vehicle is a positive correlation, and/or the relationship between the variable quantity of the monomial term and the fitting quantity corresponding to the initial traffic stream information is a positive correlation;

wherein, the curvature constraint comprises constraining a variable quantity of a quadratic term in the fitting parameter corresponding to the initial traffic stream information based on the confidence level corresponding to the historical traffic stream information and/or the motion information of the host vehicle; wherein the relationship between the variable quantity of the quadratic term and the confidence level corresponding to the historical traffic stream information is an inverse correlation, the relationship between the variable quantity of the quadratic term and the speed of the host vehicle is an inverse correlation, and/or the relationship between the variable quantity of the quadratic term and a speed of a steering wheel of the host vehicle is a positive correlation.

14. The method according to claim 1, wherein, the method further comprises:
   determining a confidence level increment based on the current traffic stream information; and
   determining a confidence level corresponding to the current traffic stream information based on the confidence level of the historical traffic stream information and the confidence level increment;
   wherein the relationship between the confidence level increment and the mean square error of the fitting result corresponding to the current traffic stream information is an inverse correlation, the relationship between the confidence level increment and the fitting quantity corresponding to the current traffic stream information is a positive correlation, and/or the relationship between the confidence level increment and the longitudinal distribution distance of the target vehicle corresponding to the current traffic stream information is a positive correlation.

15. The method according to claim 14, wherein, the determining a confidence level increment based on the current traffic stream information comprises: if two pieces of current traffic stream information intersects, then comparing the fitting quantity and the longitudinal distribution distance corresponding to the two pieces of traffic stream; and determining the confidence level increment corresponding to the current traffic stream information with a less fitting quantity or a shorter longitudinal distribution distance to be negative.

16. The method according to claim 14, wherein, the method further comprises determining a travel reference path of the host vehicle based on the current traffic stream information and the confidence level corresponding to the current traffic stream information;
   the determining the travel reference path of the host vehicle comprises:
   if the confidence levels corresponding to the current traffic stream information on both sides of the host vehicle are both higher than a preset confidence level threshold, determining that the parameter of the travel reference path of the host vehicle is a weighted average value of the fitting parameter corresponding to the current traffic stream information on both sides of the host vehicle; wherein the relationship between the weight of the fitting parameter corresponding to the current traffic stream information on both sides of the host vehicle and the change rate of the fitting parameter is an inverse correlation;
   if the confidence level corresponding to the current traffic stream information on only one side of the host vehicle is higher than a preset confidence level threshold, determining that the monomial term and the quadratic term in the parameter of the travel reference path of the host vehicle are the same as the monomial term and the quadratic term in the fitting parameter corresponding to the current traffic stream information on the side, wherein the constant term in the parameter of the travel reference path of the host vehicle is zero;
   if the confidence levels corresponding to the current traffic stream information on both sides of the host vehicle are both lower than the preset confidence level threshold, determining that the parameters of the travel reference path of the host vehicle are all zero.

17. The method according to claim 14, wherein, the method further comprises determining an auxiliary location marker based on the current traffic stream information and the confidence level corresponding to the current traffic stream information;
   the determining an auxiliary location marker comprises:
   if the confidence levels corresponding to the current traffic stream information on both sides of the host vehicle are both higher than the preset confidence level threshold, determining the auxiliary location marker as a first marker; if the confidence level corresponding to the current traffic stream information on the left side of the host vehicle is higher than the preset confidence level threshold, determining the auxiliary location marker as a second marker; and if the confidence level corresponding to the current traffic stream information on the right side of the host vehicle is higher than the preset confidence level threshold, determining the auxiliary location marker as a third marker.

18. An electronic equipment, comprising a processor and a memory, wherein the processor is operable to perform the steps of the method of claim 1 by invoking programs or instruction stored in the memory.

19. A non-transitory computer-readable storage medium, wherein, the non-transitory computer-readable storage medium stores programs or instructions for causing a computer to perform the steps of the method of claim 1.

20. A device for determining traffic stream information, comprising:
   a grouping module configured for grouping each of target vehicles based on motion information of a host vehicle and state information of one or more of the target vehicles to obtain grouping information;
   a determination module configured for determining a fitting weight for each of the target vehicles based on the state information and the grouping information for each of the target vehicles; and
   a fitting module configured for generating, by the fitting, one or more pieces of current traffic stream information based on the motion information of the host vehicle, the state information of each of the target vehicles, the fitting weights and the grouping information of each of the target vehicles;
   wherein, each group corresponds to a traffic stream; the fitting module is configured for:
   for one of the groups:
   selecting a fit method based on the number of target vehicles in the group and the longitudinal distribution distance of all target vehicles in the group;
   generating, by fitting, current traffic stream information corresponding to the group based on the selected fit method and by using the motion information of the host vehicle, the state information of each of the target vehicles in the group and the fitting weight of each of the target vehicles in the group; and
   performing lateral control of the host vehicle based on current traffic stream information.

* * * * *